United States Patent Office 3,061,594
Patented Oct. 30, 1962

3,061,594
VULCANIZATION TREATMENTS
Gerard W. Kuckro, Fairfield, Conn., assignor to General
Electric Company, a corporation of New York
No Drawing. Original application Nov. 23, 1956, Ser.
No. 623,767, now Patent No. 2,922,804, dated Jan. 26,
1960. Divided and this application Apr. 30, 1959,
Ser. No. 809,898
10 Claims. (Cl. 260—79.5)

This invention relates to vulcanization or accelerator compounds for effecting the cure of the various synthetic and natural rubbers; more particularly, the invention relates to an accelerator compound for curing butyl rubber. This application is a division of my application Serial No. 623,767, filed November 23, 1956, now U.S. Patent No. 2,922,804.

In effecting the cure of the various rubbers or elastomers, vulcanizing agents and/or accelerating agents (hereinafter referred to as cross-linking agents) to promote cross-linking of the macromolecules forming the uncured composition are introduced to the mix which is then normally subjected to heat under pressure. Since the various natural and synthetic elastomers vary considerably in degree of saturation, cross-linking agents which will be satisfactory for a highly unsaturated elastomer, such as natural rubber, will be unsatisfactory for a slightly unsaturated elastomer such as butyl rubber, and vice versa.

In addition to effecting the cure of the rubber, cross-linking agents have a considerable effect on the properties of the cured material itself. Thus, the slightly unsaturated butyl rubber has for many years been cured by a combination consisting of sulfur, 2-mercaptobenzothiazole and tetramethylthiuram disulfide when the final product is used for inner tubes. However, when butyl rubber is to be used as insulation on wire, its life must be increased by a factor of 10 over its use in inner tubes and the curing system above-described for inner tubes is totally inadequate. Where electrical insulation is the end use, the preferred cross-linking agents are p-quinonedioxime and dibenzoyl p-quinonedioxime. Neither of these latter cross-linking agents is entirely satisfactory, for p-quinonedioxime is so active that scorching is apt to result while its derivative, dibenzoyl p-quinonedioxime, is not sufficiently active to bring about a high state of cure.

It is an object of the present invention to provide cross-linking agents which can readily bring about the curing of weakly unsaturated elastomers.

It is another object of the invention to provide a vulcanizable rubber composition which includes a cross-linking agent which will effect the cure of the composition without scorching it.

It is another object of the invention to provide a method of producing vulcanized rubber by means of a new and novel cross-linking agent.

In accordance with one of its aspects, this invention is directed to a cross-linking agent of the structure

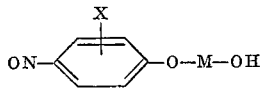

in which M is selected from the group consisting of lead, zinc, tellurium, bismuth, and cadmium; and X is selected from the group consisting of hydrogen, halogen, alkyl, aryl, aralkyl, and alkaryl.

While the above structure includes a benzene nucleus, the compound is also a satisfactory cross-linking agent in polynuclear form such as would be produced by substitution of a naphthalene or anthracene nucleus for the benzene nucleus illustrated. In its preferred form, the invention is directed to a benzene nucleus, X is hydrogen, and M is lead. This preferred compound has the formula

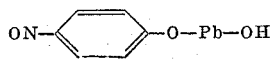

which may be considered as the basic form of the invention. While other metals may be substituted for lead and the benzene nucleus may be polynuclear or have substituent groups attached thereto, the final result is to reduce the activity of the cross-linking agent. The lead compound structurally depicted above will hereinafter be referred to as basic lead p-nitrosophenolate.

Basic lead p-nitrosophenolate may be readily prepared by reacting dilute aqueous solutions of p-nitrosophenol, sodium hydroxide, and lead nitrate, two moles of sodium hydroxide and one of lead nitrate being present for each mole of p-nitrosophenol. These components will react at room temperature to precipitate out basic lead p-nitrosophenolate in about 95% yield.

Composite samples of the dried precipitate formed by the above reaction have analyzed 21.58% carbon, 1.44% hydrogen, 3.52% nitrogen, and 59.22% lead. These percentage compositions are quite close to the theoretical compositions computed for basic lead p-nitrosophenolate showing that a high degree of purity is attained in the final product.

A final product containing metals other than lead may be produced by substituting the nitrates of such metals for lead nitrate in the above reaction. Thus, the nitrates of zinc, tellurium, bismuth, and cadmium may be substituted for lead nitrate to give the corresponding metal p-nitrosophenolates. Likewise, the corresponding naphthalene, anthracene, and other polynuclear compounds may be substituted for p-nitrosophenol to produce the corresponding polynuclear end products. While sodium hydroxide was specified in the above description, it is obvious that other hydroxides, such as potassium hydroxide, would give the same result and such variations are well within the realm of a skilled chemist.

After the precipitated lead p-nitrosophenolate has been dried, it is ready for compounding with uncured rubber prior to the forming operations such as extrusion or molding and vulcanization. Depending upon the characteristics of the uncured rubber, the cross-linking agents of this invention are added in the proportion of 0.5% to 10% by weight and further compounding and working is performed in the conventional manner as by treatment in a Banbury mixer and milling prior to forming and vulcanization. Reducing conditions are provided by 0.25% to 6% by weight of sulfur, selenium, or tellurium. A preferred reducing agent is about 1% by weight of sulfur.

While the cross-linking agents of the present invention offer advantages in the vulcanization of butyl rubber which cannot be achieved by the use of other cross-linking agents, they may also be used to vulcanize other rubbers such as natural rubber, silicone rubber, the synthetic nitrile rubbers, and other synthetic rubbers derived from butadiene or isoprene.

The cross-linking agents of this invention may be mixed with other cross-linking agents and in some cases the mixture confers properties on the final vulcanized rubber which are superior to the properties produced by either agent used alone. Thus, an excellent cross-linking agent is formed from about a 50–50 mixture of basic lead p-nitrosophenolate and lead mercaptobenzothiazole.

For ease of handling, the cross-linking agents of this invention may be mixed with an inert substance such as polyisobutylene. A satisfactory mixture of this type is 5% to 95% by weight of basic lead p-nitrosophenolate and 5% to 95% by weight of polyisobutylene. It is desirable to use as small a proportion of polyisobutylene as possible commensurate with easy and safe handling of the cross-linking agent. Other cross-linking agents may also be present in the polyisobutylene mixture. A useful mixture containing two cross-linking agents comprises about 55% by weight of basic lead p-nitrosophenolate, about 40% by weight of lead mercaptobenzothiazole, and about 5% by weight of polyisobutylene.

The foregoing invention is directed generally toward a cross-linking agent having a structure in which a metal is connected to a hydroxy group through one valence bond and through an oxygen atom to a ring having a nitroso group in the para position by the other valence bond; particularly, the invention is directed toward lead and a benzene ring in this type of structure. It is obvious that this nucleus structure can have many derivatives which incorporate such nucleus therein. Therefore, it is intended that this invention be limited only as may be necessitated by the scope of the appended claims.

What I claim as new and desire to secure by Letters Patent of the United States is:

1. The method of producing vulcanized rubber which comprises effecting the vulcanization of a composition selected from the group consisting of uncured butyl rubber, natural rubber, silicone rubber, synthetic nitrile rubber, and rubbers derived from butadiene and isoprene by a compound in which a metal selected from the group consisting of lead, zinc, tellurium, bismuth, and cadmium is connected to a hydroxy group through one valence bond and through an oxygen atom to a benzene nucleus having a nitroso group in the para position by another valence bond under reducing conditions provided by a member selected from the group consisting of sulfur, selenium and tellurium.

2. The method of claim 1 wherein vulcanization is effected by a compound of the structure

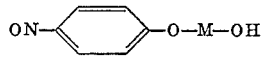

and the reducing conditions are provided by sulfur.

3. A vulcanizable composition comprising a composition selected from the group consisting of uncured butyl rubber, natural rubber, silicone rubber, synthetic nitrile rubber, and rubbers derived from butadiene and isoprene and 0.5% to 10% by weight of a compound of the structural formula

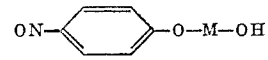

in which M is selected from the group consisting of lead, zinc, tellurium, bismuth, and cadmium.

4. A vulcanizable composition as claimed in claim 3 wherein the uncured composition is butyl rubber.

5. A vulcanizable composition as claimed in claim 3 wherein M is lead.

6. A vulcanizable composition as claimed in claim 5 wherein the uncured composition is butyl rubber.

7. A vulcanizable composition comprising uncured silicone rubber and 0.5% to 10% by weight of a compound of the structural formula

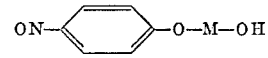

in which M is selected from the group consisting of lead, zinc, tellurium, bismuth, and cadmium.

8. A vulcanizable composition as claimed in claim 7 wherein M is lead.

9. A composition of matter comprising 5% to 95% by weight of the structure

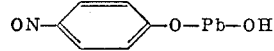

the remainder being polyisobutylene.

10. A composition of matter comprising about 55% by weight of a compound having the structure

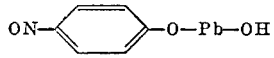

about 40% by weight of lead mercaptobenzothiazole, and about 5% by weight of polyisobutylene.

References Cited in the file of this patent

UNITED STATES PATENTS 2,444,546     Walsh _____ July 6, 1948